(12) United States Patent
Chen

(10) Patent No.: US 6,815,877 B2
(45) Date of Patent: Nov. 9, 2004

(54) FIELD EMISSION DISPLAY DEVICE WITH GRADIENT DISTRIBUTION OF ELECTRICAL RESISTIVITY

(75) Inventor: Ga-Lane Chen, Fremont, CA (US)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 10/194,110

(22) Filed: Jul. 11, 2002

(65) Prior Publication Data

US 2004/0007956 A1 Jan. 15, 2004

(51) Int. Cl.[7] ................................................ H01J 19/06
(52) U.S. Cl. ...................... 313/311; 313/309; 313/336; 313/351; 313/495; 313/310
(58) Field of Search ................................. 313/309, 336, 313/351, 495, 310, 311

(56) References Cited

U.S. PATENT DOCUMENTS

| | | | |
|---|---|---|---|
| 5,666,025 A | * | 9/1997 | Geis et al. ................... 313/495 |
| 6,031,250 A | * | 2/2000 | Brandes et al. ................. 257/77 |
| 6,577,045 B1 | * | 6/2003 | Blyablin et al. ............. 313/311 |
| 6,596,187 B2 | * | 7/2003 | Coll et al. ..................... 216/56 |

* cited by examiner

Primary Examiner—Edward J. Glick
Assistant Examiner—Elizabeth Keaney
(74) Attorney, Agent, or Firm—Wei Te Chung

(57) ABSTRACT

A field emission display device (1) includes a cathode plate (20), an electrically resistive buffer (30) made from carbon formed on the cathode plate, electron emitters (40) made from carbon formed on the buffer, and an anode plate (50) spaced from the electron emitters thereby defining an interspace region therebetween. Each electron emitter includes a nano-rod. The combined buffer and electron emitters has a gradient distribution of electrical resistivity such that highest electrical resistivity is nearest the cathode plate and lowest electrical resistivity is nearest the anode plate. When emitting voltage is applied between the cathode and anode plates, electrons emitted from the electron emitters traverse the interspace region and are received by the anode plate. Because of the gradient distribution of electrical resistivity, only a very low emitting voltage needs to be applied. Other embodiments include single walled and multi-walled nanotubes (40', 40").

21 Claims, 3 Drawing Sheets

FIELD EMISSION DISPLAY DEVICE WITH GRADIENT DISTRIBUTION OF ELECTRICAL RESISTIVITY

BACKGROUND OF THE INVENTION

1. Field of the Invention

The present invention relates to a field emission display (FED) device, and more particularly to an FED device using nano-sized electron emitters having low power consumption.

2. Description of Prior Art

In recent years, flat panel display devices have been developed and widely used in electronic applications such as personal computers. One popular kind of flat panel display device is an active matrix liquid crystal display (LCD) that provides high resolution. However, the LCD has many inherent limitations that render it unsuitable for a number of applications. For instance, LCDs have numerous manufacturing shortcomings. These include a slow deposition process inherent in coating a glass panel with amorphous silicon, high manufacturing complexity, and low yield of units having satisfactory quality. In addition, LCDs require a fluorescent backlight. The backlight draws high power, yet most of the light generated is not viewed and is simply wasted. Furthermore, an LCD image is difficult to see under bright light conditions and at wide viewing angles. Moreover, since the response time of an LCD is dependent upon the response time of a liquid crystal to an applied electrical field, the response time of the LCD is correspondingly slow. A typical response time of an LCD is in the range from 25 ms to 75 ms. Such difficulties limit the use of LCDs in many applications such as High-Definition TV (HDTV) and large displays. Plasma display panel (PDP) technology is more suitable for HDTV and large displays. However, a PDP consumes a lot of electrical power. Further, the PDP device itself generates too much heat.

Other flat panel display devices have been developed in recent years to improve upon LCDs and PDPs. One such flat panel display device, a field emission display (FED) device, overcomes some of the limitations of and provides significant advantages over conventional LCDs and PDPs. For example, FED devices have higher contrast ratios, wider viewing angles, higher maximum brightness, lower power consumption, shorter response times and broader operating temperature ranges when compared to conventional thin film transistor liquid crystal displays (TFT-LCDs) and PDPs.

One of the most important differences between an FED and an LCD is that, unlike the LCD, the FED produces its own light source utilizing colored phosphors. The FED does not require complicated, power-consuming backlights and filters. Almost all light generated by an FED is viewed by a user. Furthermore, the FED does not require large arrays of thin film transistors. Thus, the costly light source and low yield problems of active matrix LCDs are eliminated.

In an FED device, electrons are extracted from tips of a cathode by applying a voltage to the tips. The electrons impinge on phosphors on the back of a transparent cover plate and thereby produce an image. The emission current, and thus the display brightness, is highly dependent on the work function of an emitting material at the field emission source of the cathode. Conventional FED devices employ metal microtips as the emitting material. However, it is difficult to precisely fabricate extremely small metal microtips for the field emission source. In addition, it is necessary to maintain the inside of the electron tube at a very high vacuum of about $10^{-7}$ Torr, in order to ensure continued accurate operation of the microtips. The very high vacuum required greatly increases manufacturing costs. Furthermore, a typical FED device needs a high voltage applied between the cathode and the anode, commonly in excess of 1000 volts.

Recently, carbon nano-tubes have been increasingly suggested as having the most potential to overcome the aforementioned disadvantages of conventional field emission sources. Carbon nano-tubes can accurately concentrate electrons emanating from a field emission source, and are chemically stable and mechanically sturdy. U.S. Pat. No. 6,339,281 discloses an FED device employing carbon nano-tubes as emitters. As shown in FIG. 5, the FED device comprises a glass substrate 91, a cathode electrode 92 formed on the glass substrate 91, a base layer 93 deposited on the cathode electrode 92, and carbon nano-tubes 95 formed on a catalyst layer 94 formed on the base layer 93. A material of the base layer 93 has good conductivity, for providing effective electrical contact between the cathode electrode 92 and the carbon nano-tubes 95. However, when emission voltage is applied to the nano-tubes, electrons are emitted not only from the nano-tubes but also from the base layer. It is difficult to control the emitted electrons, which adversely affects the quality of the display produced.

SUMMARY OF THE INVENTION

In view of the above-described drawbacks, an object of the present invention is to provide a field emission display (FED) device which has low power consumption.

Another object of the present invention is to provide an FED device which has accurate and reliable electron emission.

In order to achieve the objects set out above, an FED device in accordance with a preferred embodiment of the present invention comprises a cathode plate, an electrically resistive buffer made from carbon formed on the cathode plate, a plurality of electron emitters made from carbon formed on the buffer, and an anode plate spaced from the electron emitters thereby defining an interspace region therebetween. Each electron emitter comprises a nano-rod. The combined buffer and electron emitters has a gradient distribution of electrical resistivity such that highest electrical resistivity is nearest the cathode plate and lowest electrical resistivity is nearest the anode plate. When emitting voltage is applied between the cathode and anode plates, electrons emitted from the electron emitters traverse the interspace region and are received by the anode plate. Because of the gradient distribution of electrical resistivity, only a very low emitting voltage needs to be applied.

In alternative embodiments, each electron emitter comprises a carbon nanotube that has uniform electrical resistivity. Only the buffer has a gradient distribution of electrical resistivity. The nanotube may be a single walled nanotube or a multi-walled nanotube.

In still further alternative embodiments, the buffer and/or the electron emitters can incorporate more than one gradient distribution of electrical resistivity.

Other objects, advantages and novel features of the present invention will become more apparent from the following detailed description when taken in conjunction with the accompanying drawings, in which:

DETAILED DESCRIPTION OF PREFERRED EMBODIMENTS OF THE INVENTION

Figure 1:
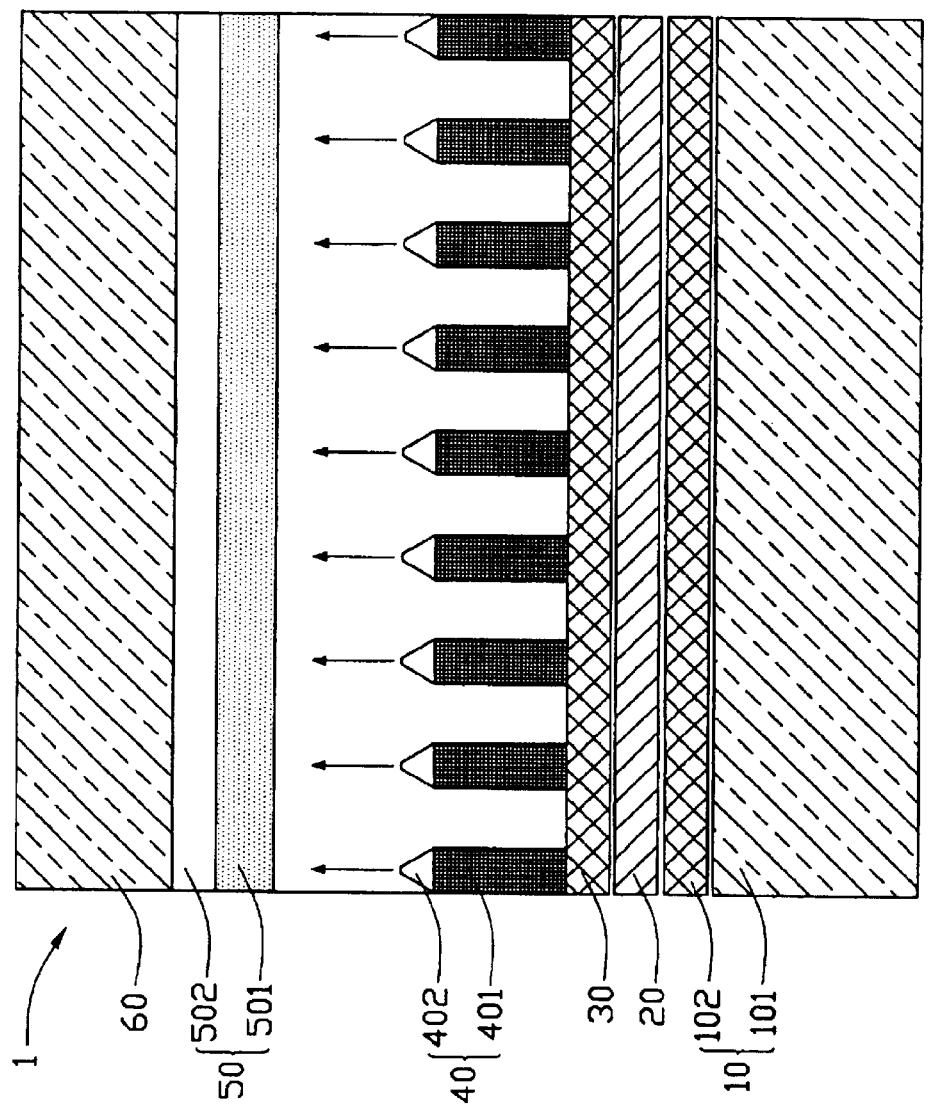
FIG. 1 is a schematic cross-sectional view of a field emission display (FED) device in accordance with a preferred embodiment of the present invention.

Referring to FIG. 1, a field emission display (FED) device 1 in accordance with a preferred embodiment of the present invention comprises a first substrate 10, a cathode plate 20 made from electronically conductive material formed on the first substrate 10, an electrically resistive buffer 30 formed on the cathode plate 20, a plurality of parallel electron emitters 40 formed on the buffer 30, an anode plate 50 spaced from the electron emitters 40 to define an interspace (not labeled) region between the electron emitters 40 and the anode plate 50, and a second substrate 60.

The first substrate 10 comprises a glass plate 101 and a silicon thin film 102. The silicon thin film 102 is formed on the glass plate 101 for providing effective contact between the glass plate 101 and the cathode plate 20. The buffer 30 formed on the cathode plate 20 is to prevent the cathode plate 20 from emitting electrons after emitting voltage has been provided between the cathode plate 20 and the anode plate 50.

Figure 2:
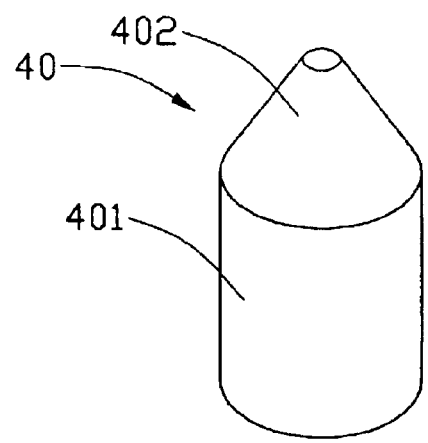
FIG. 2 is an enlarged perspective view of an electron emitter of the FED device in accordance with the preferred embodiment of the present invention.

Referring also to FIG. 2, each electron emitter 40 is substantially a nano-rod. The electron emitter 40 comprises a rod-shaped first part 401 adjacent the buffer 30, and a conical second part 402 distal from the buffer 30. In the preferred embodiment, the electron emitters 40 and the buffer 30 are made of carbon. The carbon comprises diamond-rich carbon having high electrical resistivity, and graphite-like carbon having low electrical resistivity. Electrical resistivity of the combined buffer 30 and electron emitters 40 gradually decreases from the buffer 30 adjacent the cathode plate 20 to distal ends of the second parts 402 of the electron emitters 40. That is, a gradient distribution of electrical resistivity exists ranging from high electrical resistivity at the buffer 30 adjacent the cathode plate 20 to semi-conductivity at distal ends of the second parts 402. Therefore, for electrons to be emitted from the electron emitters 40, only a very low emitting voltage needs to be applied. In the preferred embodiment, the first part 401 of each electron emitter 40 has microstructure comprising a nano-rod with a diameter in the range from 5 to 50 nanometers. The first part 401 of the electron emitter 40 has a length in the range from 0.2 to 2.0 micrometers. The second part 402 of the electron emitter 40 has microstructure comprising a circular open tip (not labeled) at the distal end thereof. A diameter of the tip is in the range from 0.3 to 2.0 nanometers. In the preferred embodiment, the buffer 30 and electron emitters 40 can be pre-formed by chemical vapor deposition (CVD) or plasma-enhanced chemical vapor deposition (PECVD), or by other suitable chemical-physical deposition methods such as reactive sputtering, ion-beam sputtering, dual ion beam sputtering, and other suitable glow discharge methods. Thereupon the electron emitters 40 can be formed by e-beam etching or other suitable methods.

Figure 3:
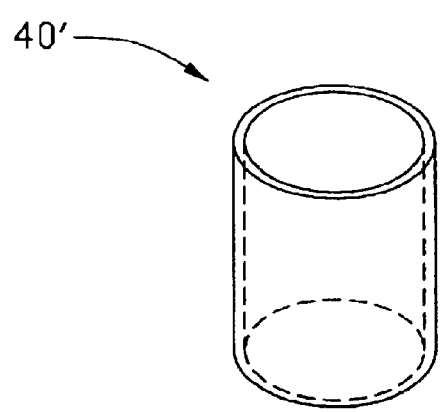
FIG. 3 is an enlarged perspective view of an electron emitter in accordance with an alternative embodiment of the present invention.

FIG. 3 shows an electron emitter 40' in accordance with an alternative embodiment of the present invention. The electron emitter 40' has microstructure comprising a single walled carbon nanotube. A thickness of the wall is in the range from 0.3 to 2.0 nanometers, and preferably in the range from 0.5 to 1.0 nanometers. A length of the electron emitter 40' is in the range from 0.2 to 2.0 micrometers. The electron emitter 40' has uniform electrical resistivity. However, electrical resistivity of the buffer 30 gradually decreases from a plane distal from the electron emitters 40' to a plane adjacent the electron emitters 40'. That is, a gradient distribution of electrical resistivity exists in the buffer 30 ranging from high electrical resistivity distal from the electron emitters 40' to semi-conductivity adjacent the electron emitters 40'. In this alternative embodiment of the present invention, the buffer 30 can be pre-formed by chemical vapor deposition (CVD) or plasma-enhanced chemical vapor deposition (PECVD), or by other suitable chemical-physical deposition methods such as reactive sputtering, ion-beam sputtering, dual ion beam sputtering, and other suitable glow discharge methods, and the electron emitters 40' can be formed on the buffer 30 by growing by way of chemical vapor deposition (CVD), plasma-enhanced chemical vapor deposition (PECVD), plasma arc discharge or laser ablation.

Figure 4:
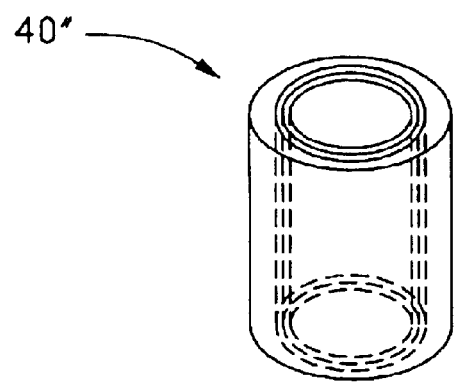
FIG. 4 is an enlarged perspective view of an electron emitter in accordance with a further alternative embodiment of the present invention.
Figure 5:
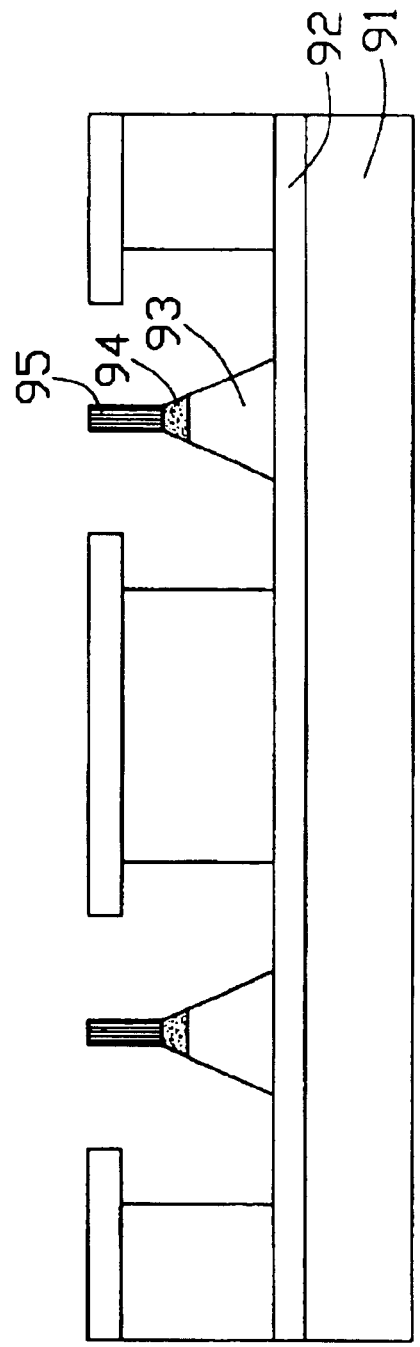
FIG. 5 is a schematic side plan view of a conventional FED device employing carbon nano-tubes.

FIG. 4 shows an electron emitter 40" in accordance with a further alternative embodiment of the present invention. The electron emitter 40" has microstructure comprising a multi-walled carbon nanotube. A thickness of the wall is in the range from 5 to 50 nanometers, and preferably in the range from 10 to 20 nanometers. A length of the electron emitter 40" is in the range from 0.2 to 2.0 micrometers. The electron emitter 40" has uniform electrical resistivity. However, electrical resistivity of the buffer 30 gradually decreases from a plane distal from the electron emitters 40" to a plane adjacent the electron emitters 40". That is, a gradient distribution of electrical resistivity exists in the buffer 30 ranging from high electrical resistivity distal from the electron emitters 40" to semi-conductivity adjacent the electron emitters 40". In this further alternative embodiment of the present invention, the buffer 30 can be pre-formed by chemical vapor deposition (CVD) or plasma-enhanced chemical vapor deposition (PECVD), or by other suitable chemical-physical deposition methods such as reactive sputtering, ion-beam sputtering, dual ion beam sputtering, and other suitable glow discharge methods, and the electron emitters 40" can be formed on the buffer 30 by growing by way of chemical vapor deposition (CVD), plasma-enhanced chemical vapor deposition (PECVD), plasma arc discharge or laser ablation.

In still further alternative embodiments of the present invention, the buffer 30 and/or the electron emitters 40 can incorporate more than one gradient distribution of electrical resistivity.

The anode plate 50 is formed on the second substrate 60, and comprises a transparent electrode 502 coated with a phosphor layer 501. The transparent electrode 502 allows light to pass therethrough. The transparent electrode 502 may comprise, for example, indium tin oxide (ITO). The phosphor layer 501 luminesces upon receiving electrons emitted by the electron emitters 40. The second substrate 60 is preferably made from glass.

In operation of the FED device 1, an emitting voltage is applied between the cathode plate 20 and the anode plate 50. This causes electrons to emit from the electron emitters 40. The electrons traverse the interspace region from the electron emitters 40 to the anode plate 50, and are received by the phosphor layer 501. The phosphor layer 501 luminesces, and a display is thus produced. Because the electrode 502 and the second substrate 60 are all transparent, a viewer can see the produced display on the other side of the second substrate 60.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A field emission display device comprising:
   a cathode plate;
   a resistive buffer adjacent the cathode plate, the resistive buffer comprising carbon;
   a plurality of electron emitters adjacent the resistive buffer, the electron emitters comprising carbon; and
   an anode plate spaced from the electron emitters thereby defining an interspace region therebetween;
   wherein the resistive buffer comprises at least one gradient distribution of electrical resistivity such that highest electrical resistivity is nearest the cathode plate and lowest electrical resistivity is nearest the anode plate.

2. The field emission display device as described in claim 1, wherein each of the electron emitters comprises a first part adjacent the resistive buffer and a second part distal from the resistive buffer.

3. The field emission display device as described in claim 2, wherein the first part has microstructure comprising a nano-rod having a diameter in the range from 5 to 50 nanometers.

4. The field emission display device as described in claim 3, wherein the nano-rod of the first part has a length in the range from 0.2 to 2.0 micrometers.

5. The field emission display device as described in claim 2, wherein the second part has substantially conical microstructure.

6. The field emission display device as described in claim 5, wherein the substantially conical microstructure comprises an open tip distal from the first part, a diameter of the tip being in the range from 0.3 to 2.0 nanometers.

7. The field emission display device as described in claim 1, wherein each of the electron emitters has microstructure comprising a single walled nanotube.

8. The field emission display device as described in claim 7, wherein a thickness of the wall of the nanotube is in the range from 0.3 to 2.0 nanometers.

9. The field emission display device as described in claim 1, wherein each of the electron emitters has microstructure comprising a multi-walled nanotube.

10. The field emission display device as described in claim 9, wherein a thickness of the multi-walled nanotube is in the range from 5 to 50 nanometers.

11. The field emission display device as described in claim 1, wherein the anode plate comprises a transparent electrode coated with phosphor.

12. The field emission display device as described in claim 11, wherein the transparent electrode comprises indium tin oxide.

13. The field emission display device as described in claim 1, wherein the cathode plate is formed on a first substrate comprising glass, and the anode plate is formed on a second substrate comprising glass.

14. The field emission display device as described in claim 13, wherein the first substrate further comprises a silicon thin film formed thereon for providing effective contact between the first substrate and the cathode plate.

15. A field emission display device comprising:
    a cathode plate;
    a resistive buffer adjacent the cathode plate, the resistive buffer comprising carbon;
    a plurality of electron emitters adjacent the resistive buffer, the electron emitters comprising carbon; and
    an anode plate spaced from the electron emitters thereby defining an interspace region therebetween;
    wherein the whole or any part of the combined resistive buffer and electron emitters comprises at least one gradient distribution of electrical resistivity such that highest electrical resistivity is nearest the cathode plate and lowest electrical resistivity is nearest the anode plate.

16. The field emission display device as described in claim 15, wherein each of the electron emitters comprises a first part adjacent the resistive buffer and a second part distal from the resistive buffer.

17. The field emission display device as described in claim 16, wherein the first part has microstructure comprising a nano-rod having a diameter in the range from 5 to 50 nanometers.

18. The field emission display device as described in claim 17, wherein the nano-rod of the first part has a length in the range from 0.2 to 2.0 micrometers.

19. The field emission display device as described in claim 16, wherein the second part has substantially conical microstructure.

20. The field emission display device as described in claim 19, wherein the substantially conical microstructure comprises an open tip distal from the first part, a diameter of the tip being in the range from 0.3 to 2.0 nanometers.

21. A field emission display device comprising:
    a cathode plate;
    an anode plate spaced from the cathode plate; and
    a plurality of electron emitters positioned between the cathode plate and the anode plate with connection to the cathode plate while with an interspace region from the anode plate, each of said electron emitters being a nano-rod; wherein
    said nano-rod includes a rod-shaped part close to the cathode plate and being electrically isolative, and a conical second part close to the anode plate and being electrically conductive.

* * * * *